US006817020B2

(12) United States Patent
Huang et al.

(10) Patent No.: US 6,817,020 B2
(45) Date of Patent: Nov. 9, 2004

(54) EJECTION STRUCTURE

(75) Inventors: Chen-Yuan Huang, Taipei (TW); Chishen Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 96 days.

(21) Appl. No.: 10/225,279

(22) Filed: Aug. 22, 2002

(65) Prior Publication Data

US 2004/0001417 A1 Jan. 1, 2004

(30) Foreign Application Priority Data

Jun. 28, 2002 (TW) ........................................ 91209857 U

(51) Int. Cl.[7] .......................... G11B 47/03; G11B 33/02
(52) U.S. Cl. ..................................... 720/600; 369/75.21
(58) Field of Search ................................. 369/75.2, 75.1, 369/77.1, 77.2, 75.11, 75.21, 77.11, 77.21; 360/99.02, 99.06; 720/600

(56) References Cited

U.S. PATENT DOCUMENTS 6,577,577 B2 * 6/2003 Watanabe et al. .......... 369/75.2

2001/0026520 A1 * 10/2001 Watanabe et al. .......... 369/75.2
2003/0002421 A1 * 1/2003 Ming-Hui et al. ......... 369/77.1
2003/0072243 A1 * 4/2003 Yeh et al. .................. 369/75.2

* cited by examiner

Primary Examiner—Allen Cao
(74) Attorney, Agent, or Firm—Birch, Stewart, Kolasch & Birch, LLP

(57) ABSTRACT

An ejection structure for an optical disk drive having a tray. The ejection structure is disposed on the back surface of the tray to eject the tray. The ejection structure comprises a base, a motor, a worm gear, a limit switch, a main gear, a first pushing arm, a second protruding pin, a twisting spring, a third protruding pin and a second pushing arm. When the motor drives the worm gear, the worm gear drives the main gear to rotate, so that the first pushing arm and the second pushing arm rotate and move relatively to eject the tray. When the first pushing arm is pushed from the outside of the tray, the first pushing arm drives the second pushing arm to move linearly to eject the tray.

20 Claims, 11 Drawing Sheets

EJECTION STRUCTURE

BACKGROUND OF THE INVENTION

1. Field of the Invention

The present invention relates to an ejection structure, and in particular to an ejection structure for a thin optical disk drive.

2. Description of the Related Art

In a conventional thin optical disk drive, an ejection structure is used to eject a tray. The ejection structure can secure and release the tray as needed when the optical disk drive is working. The conventional thin optical disk drive uses either a solenoid or a complicated mechanism having a D.C. motor as the main body of the ejection structure, thus causing complexity of assembly and increasing the manufacturing cost.

FIG. 1 is a schematic view showing the inner configuration of a conventional thin optical disk drive (U.S. Pat. No. 5,862,116). The tray 41 can be secured in and released from the chassis 56. The ejection structure of the conventional thin optical disk drive is composed of a locking arm 239 and a solenoid 45, as shown in FIG. 2. The solenoid 45 is the power source of the ejection structure. The positioning and emergent ejection of the tray 41 can be accomplished by utilizing the reciprocal relationship between the locking arm 239 and a positioning pin (not shown) on the casing.

FIG. 3 is a schematic view showing the tray positioned in the chassis of the conventional thin optical disk drive. The geometric shape of the locking arm 239 is complicated. Thus, it is not easy to manufacture the locking arm 239. Additionally, the locking arm 239 has a large volume, thus causing inconvenience in assembling the conventional thin optical disk drive.

Consequently, an object of the invention is to provide a simplified ejection structure for a thin optical disk drive. The thin optical disk drive can achieve the functions of ejection, emergent ejection and tray positioning using a motor and some simple elements. Specifically, the manufacturing cost of the ejection structure of the invention is reduced and the assembly of the ejection structure of the invention is simplified.

SUMMARY OF THE INVENTION

An object of the invention is to provide an ejection structure for an optical disk drive having a tray. The ejection structure is disposed on the back side of the tray to eject the tray. The ejection structure comprises a base; a motor disposed on the base; a worm gear connected to the motor; a limit switch disposed on the base; a main gear disposed on the base and engaged with the worm gear, the main gear having a first protruding pin; a first pushing arm disposed on the main gear and having a first through groove and a through hole; a second protruding pin disposed on the base and fitting in the through hole of the first pushing arm; a twisting spring fitting on the second protruding pin and disposed between the first pushing arm and the base providing resilient force to the first pushing arm; a third protruding pin disposed on the base; a second pushing arm disposed on the first pushing arm and having a second through groove and an engaging pin, wherein the first protruding pin and the third protruding pin fit in the second through groove, and the engaging pin fits in the first through groove of the first pushing arm.

When the motor drives the worm gear, the worm gear drives the main gear to rotate, so that the first pushing arm and the second pushing arm rotate and move relatively to eject the tray.

When the first pushing arm is pushed from the outside of the tray, the first pushing arm drives the second pushing arm to move linearly to eject the tray.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
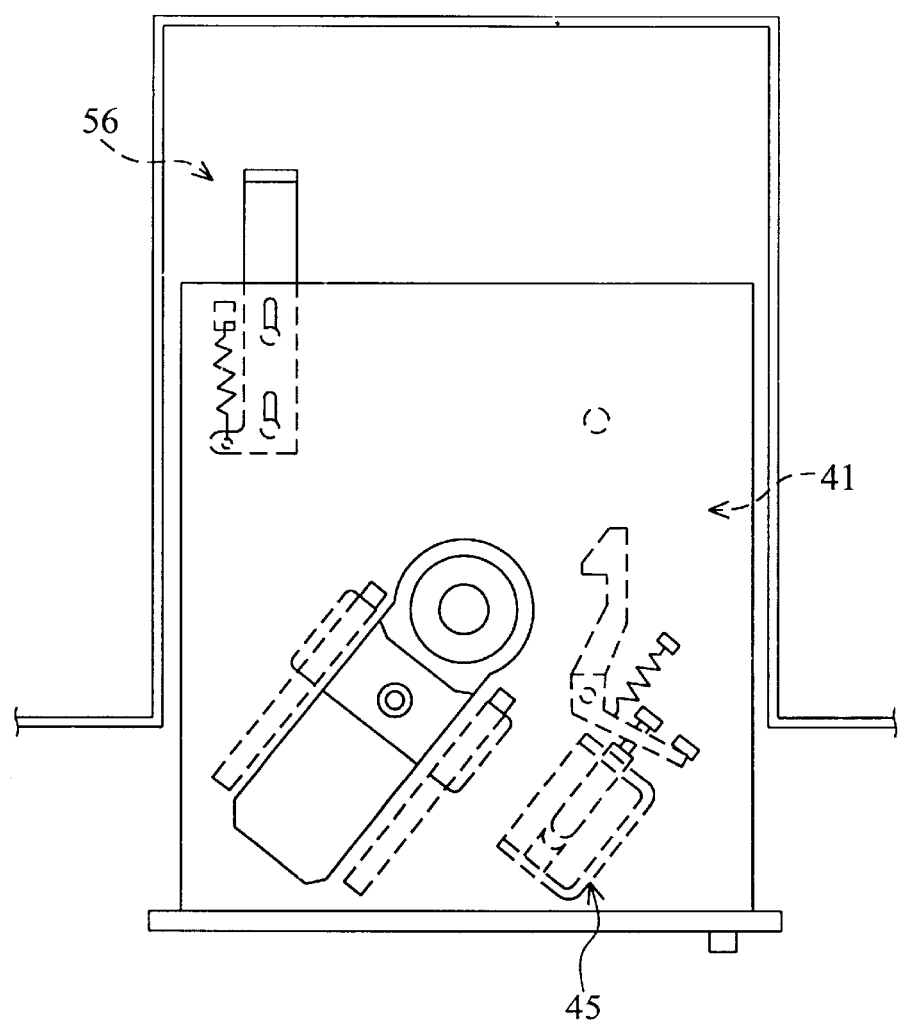
FIG. 1 is a schematic view showing the inner configuration of a conventional thin optical disk drive.
Figure 2:
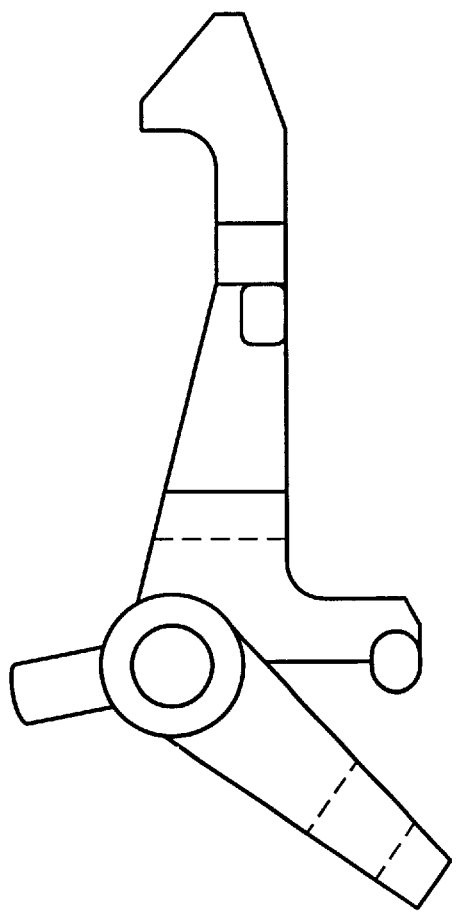
FIG. 2 shows the locking arm of the conventional thin optical disk drive.
Figure 3:
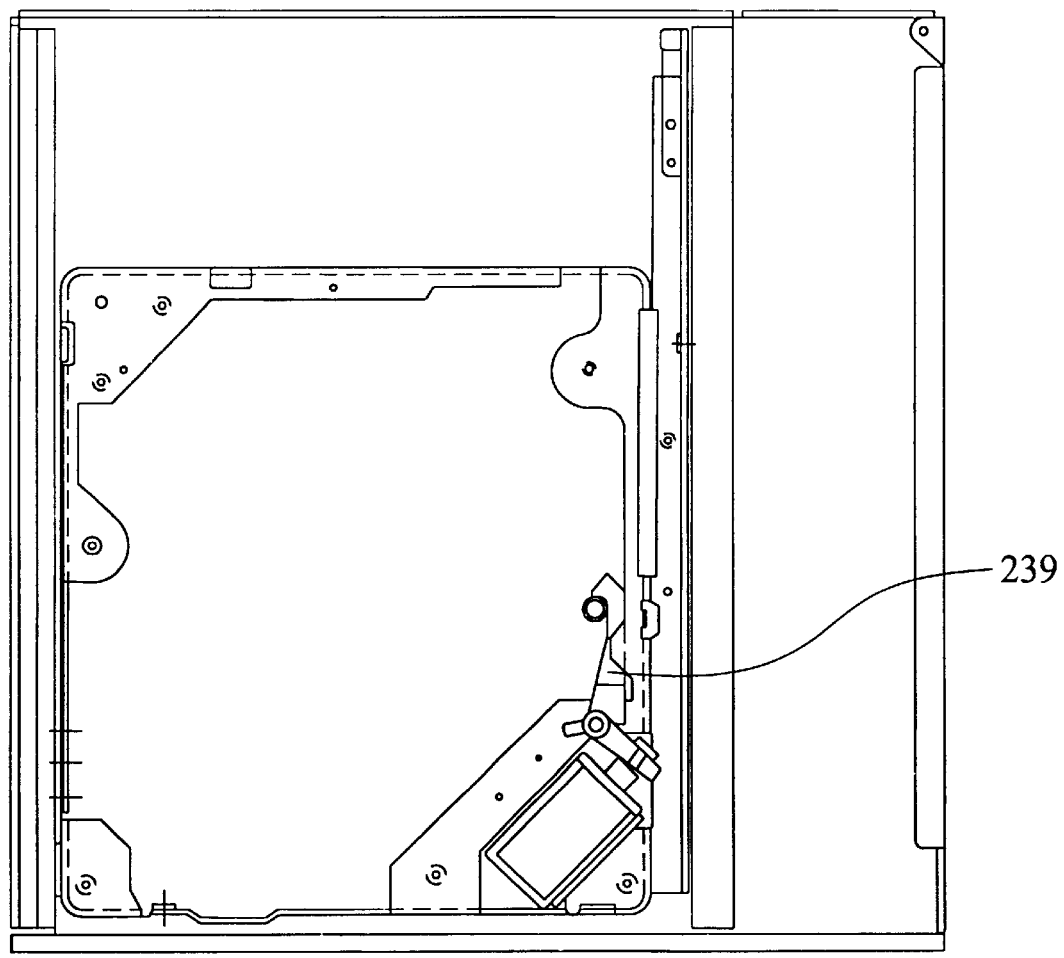
FIG. 3 is a schematic view showing the tray positioned in the chassis of the conventional thin optical disk drive.
Figure 4:
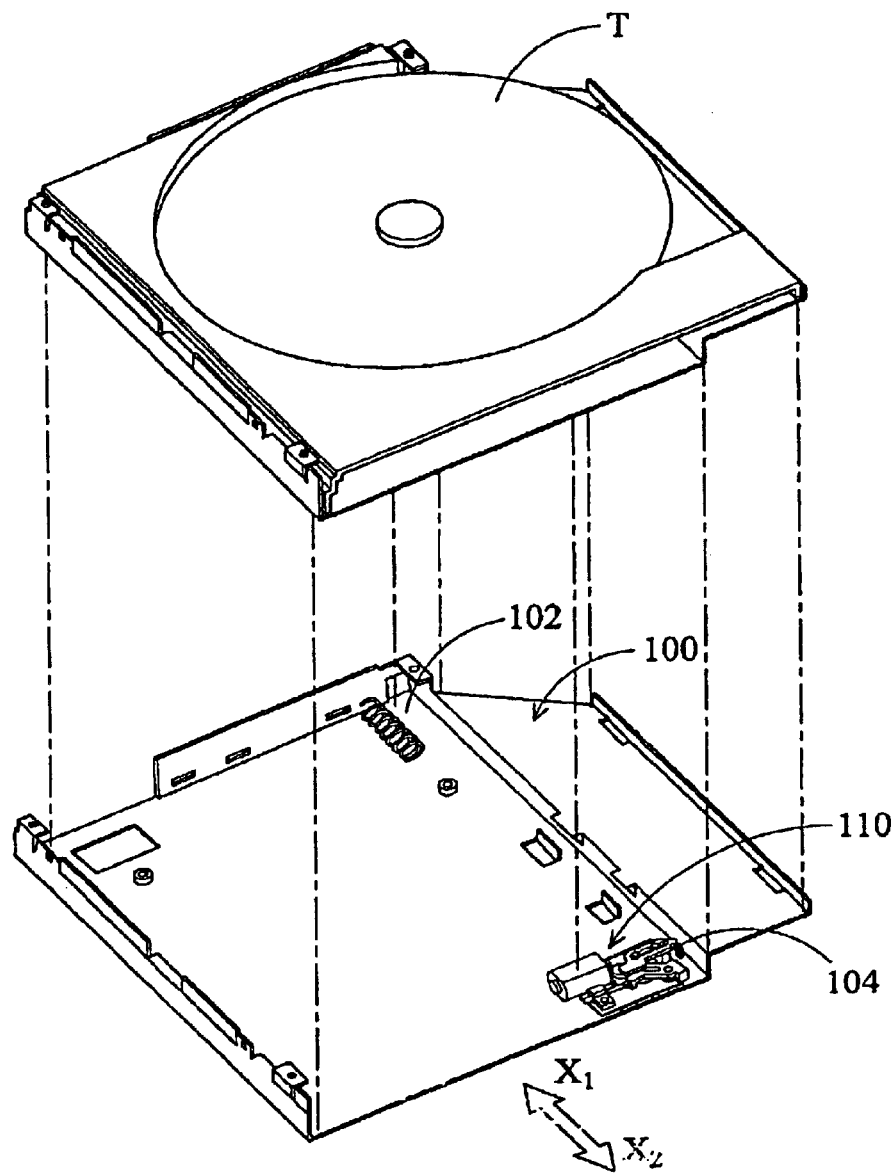
FIG. 4 is a schematic view showing the chassis, a tray and ejection structure of the present thin optical disk drive.

Referring to FIG. 4, the thin optical disk drive comprises a chassis 100, a tray T and an ejection structure 110. The tray is disposed on the chassis 100 and slides in two directions $X_1$ and $X_2$. In this embodiment, the ejection structure 110 is disposed on the back surface of the tray T. The chassis 100 further comprises a spring 102 and a protrusion 104. The spring 102 is disposed on one side of the chassis 100 and provides resilient force to the tray. The ejection structure 110 is engaged with the protrusion 104.

Figure 5:
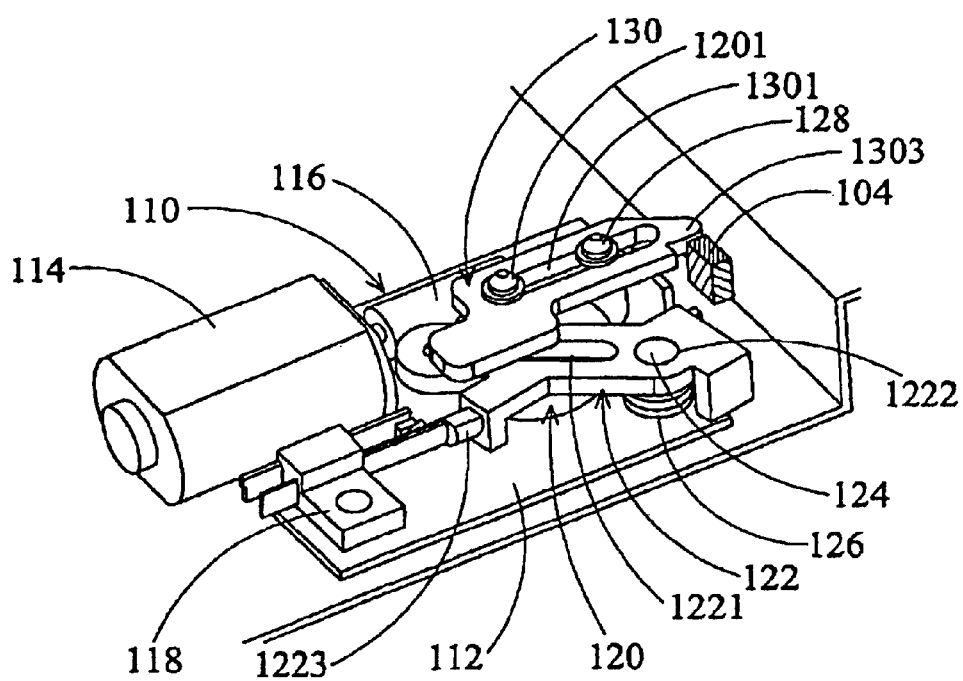
FIG. 5 is a perspective assembly view of the ejection structure of the invention.
Figure 6:
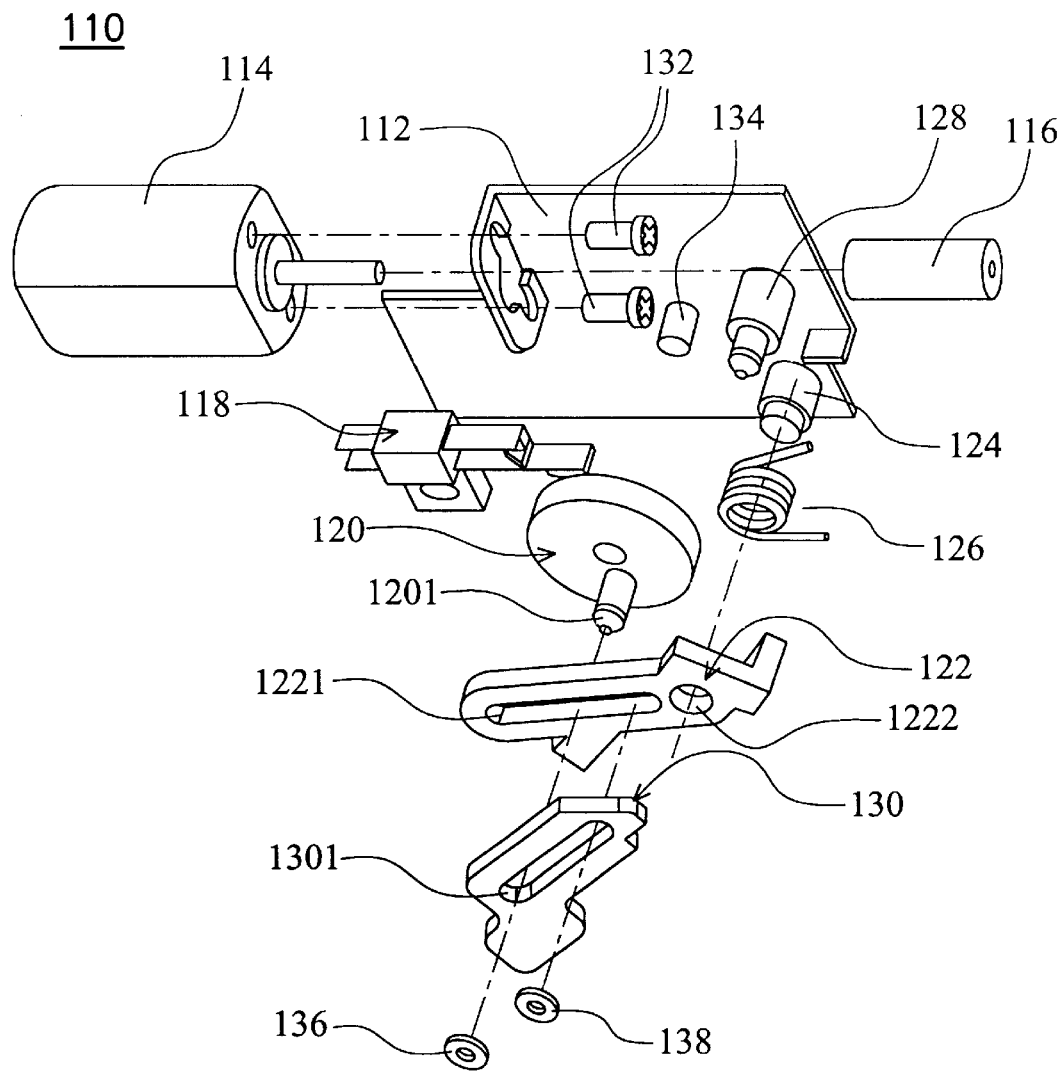
FIG. 6 is a perspective exploded view of the ejection structure of the invention.
Figure 7:
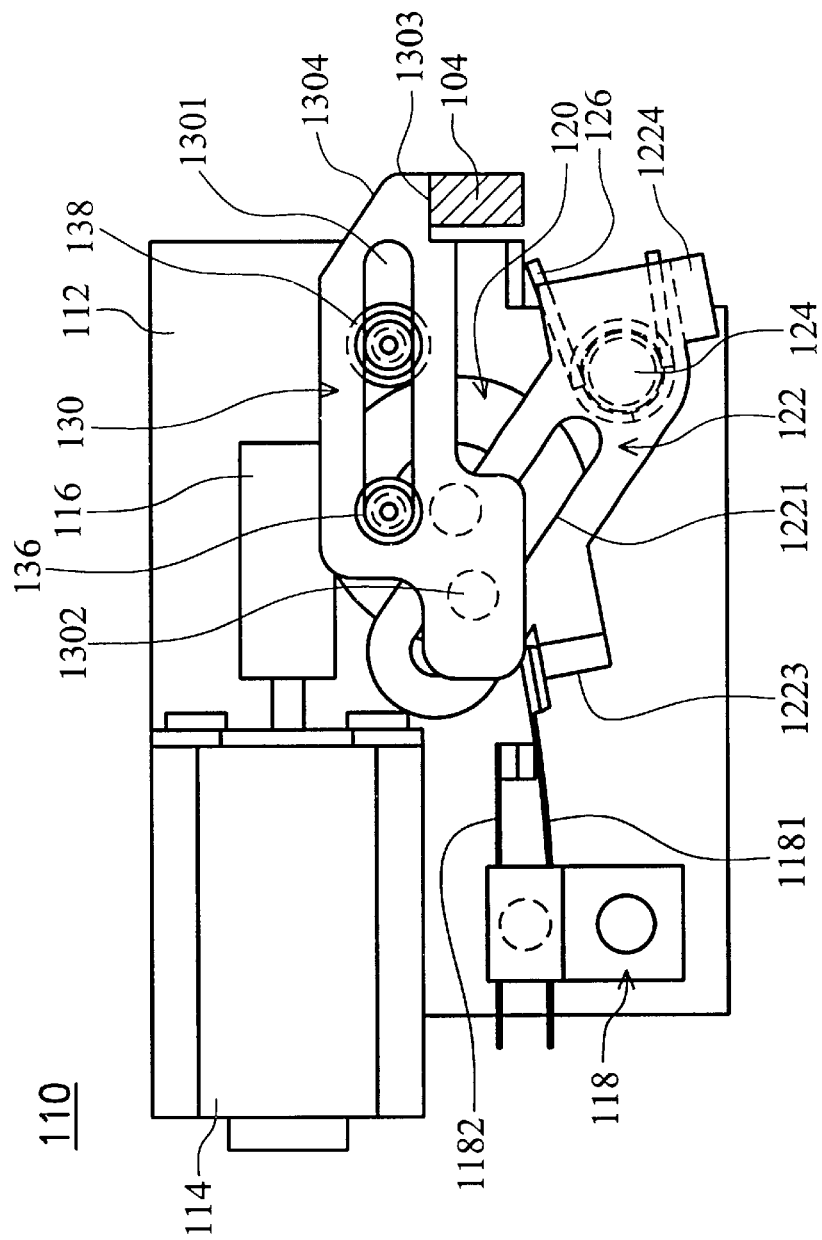
FIG. 7 is a top view of the ejection structure of the invention, wherein the main gear is located at a position of 0 degree.
Figure 8:
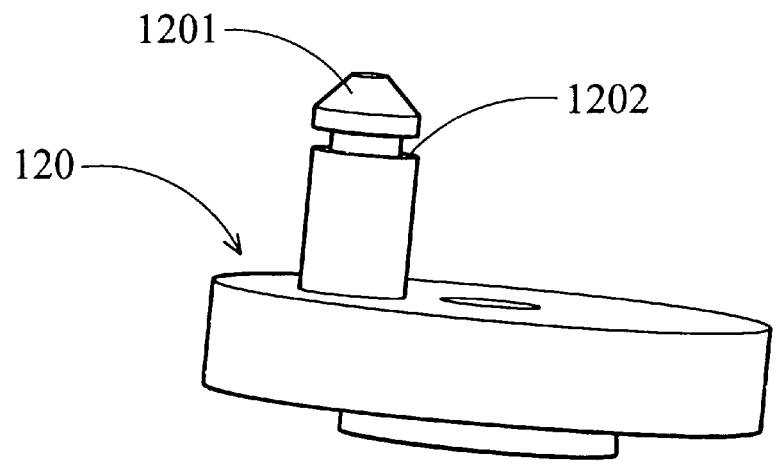
FIG. 8 shows a perspective view of the main gear of the present ejection structure.

Referring to FIG. 5, FIG. 6 and FIG. 7, the ejection structure 110 comprises a base 112, a motor 114, a worm gear 116, a limit switch 118, a main gear 120, a first pushing arm 122, a second protruding pin 124, a twisting spring 126, a third protruding pin 128 and a second pushing arm 130. The motor 114 is disposed on the base 112. The worm gear 116 is connected to the motor 114. The limit switch 118 is disposed on the base 112. The main gear 120 is disposed on the base 112 and engaged with the worm gear 116. The main gear 120 has a first protruding pin 1201, as shown in FIG. 8. The first pushing arm 122 is disposed on the main gear 120 and has a first through groove 1221 and a through hole 1222. The second protruding pin 124 is disposed on the base 112 and fits in the through hole 1222 of the first pushing arm 122. The twisting spring 126 fits on the second protruding pin 124 and is disposed between the first pushing arm 122 and the base 112 providing resilient force to the first pushing arm 122. The third protruding pin 128 is disposed on the base 112. The second pushing arm 130 is disposed on the first pushing arm 122 and has a second through groove 1301 and an engaging pin 1302. The first protruding pin 1201 and the third protruding pin 128 fits in the second through groove 1301. The engaging pin 1302 fits in the first through groove 1221 of the first pushing arm 122.

Additionally, the motor 114 is fixed on the base 112 by two bolts 132. The limit switch 118 has a first connection portion 1181 and a second connection portion 1182. The first pushing arm 122 has a first protruding portion 1223 providing resilient force to the first connection portion 1181 of the limit switch 118. The base 112 has a fourth protruding pin 134 fitting in the main gear 120.

As shown in FIG. 6 and FIG. 7, two washers or fasteners 136, 138 are disposed on the first protruding pin 1201 and the third protruding pin 128, respectively. Further, the washers or fasteners 136, 138 are disposed on the second pushing arm 130 for fixing the first pushing arm 122 and the second pushing arm 130 on a proper position.

As shown in FIG. 8, the washer or fastener 136 are disposed in the groove 1202 of the first protruding pin 1201 to prevent the second pushing arm 130 from falling off the first protruding pin 1201. Similarly, the third protruding pin 128 has a groove (not shown) for disposing the washer or fastener 138. The washer or fastener 138 is used to prevent the second pushing arm 130 from falling off the third protruding pin 128.

When the tray is located in the chassis 100, the ejection structure 110 is in a situation as shown in FIG. 7. The engaging portion 1303 of the second pushing arm 130 is engaged with the protrusion 104 of the chassis 100. By pushing an eject button (not shown) disposed on the outside of the tray T, the motor 114 can be driven to eject the tray from the chassis 100. Because the worm gear 116 is connected to the motor 114, the worm gear 116 is driven to rotate. Then, the worm gear 116 drives the main gear 120 to rotate clockwise. The first pushing arm 122 and the second pushing arm 130 can rotate and move relatively by rotation of the main gear 120. Specifically, as shown in FIG. 7, the ejection structure 110 is in an initial situation. The engaging portion 1303 is engaged with the protrusion 104. The first protruding portion 1223 of the first pushing arm 122 oppresses the first connection portion 1181 of the limit switch 118. Thus, the first connection portion 1181 is connected to the second connection portion 1182 and the limit switch 118 is in "ON" position.

When the motor 114 is actuated, the main gear 120 can rotate for a cycle around the fourth protruding pin 134. The second pushing arm 130 can rotate around the first protruding pin 1201 and the third protruding pin 128 fitting in the second through groove 1301. Then, the engaging portion 1303 of the second pushing arm 130 can gradually disengage from the protrusion 104.

Figure 9:
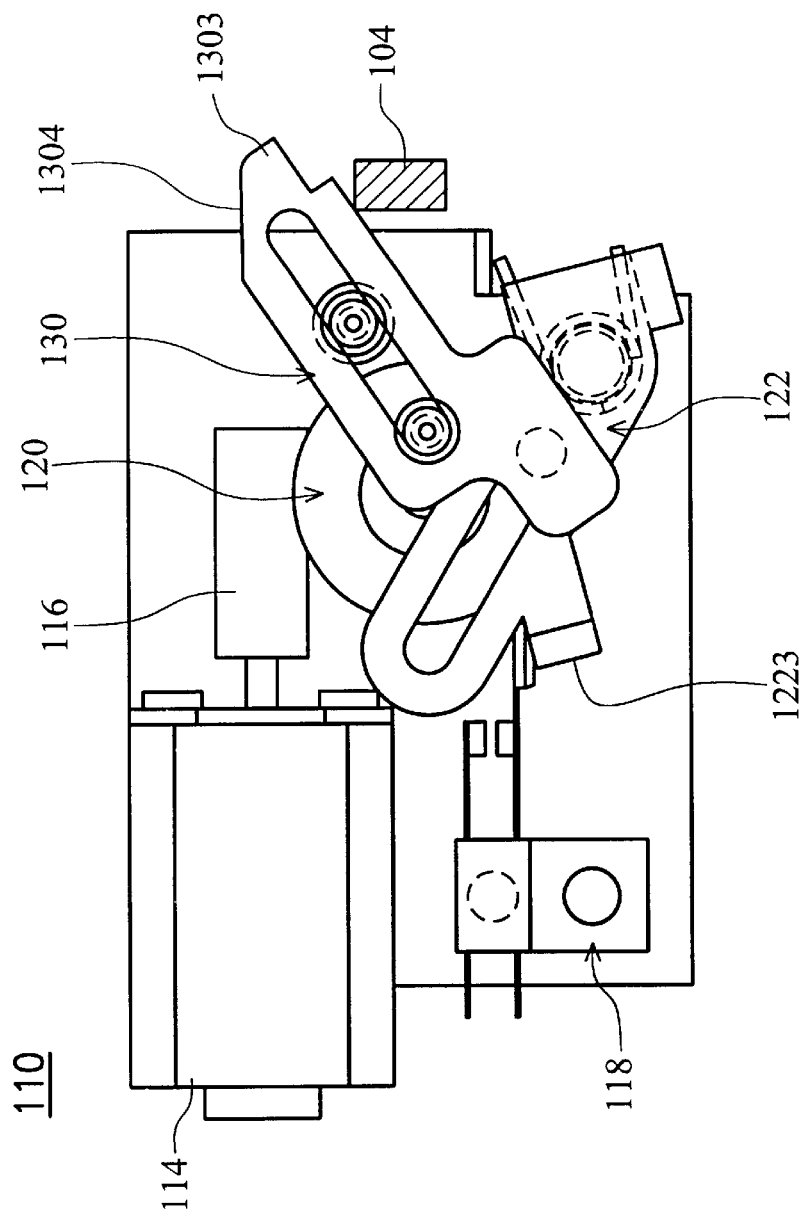
FIG. 9 is a top view of the ejection structure of the invention, wherein the main gear is located at a position of 90 degrees.

When the main gear 120 rotates clockwise to a position of 90 degrees, as shown in FIG. 9, the first connection portion 1181 cannot be connected to the second connection portion 1182 by oppression of the first protruding portion 1223 of the first pushing arm 122 due to the displacement of the first pushing arm 122. Thus, the limit switch 118 is in the "OFF" position.

Figure 10:
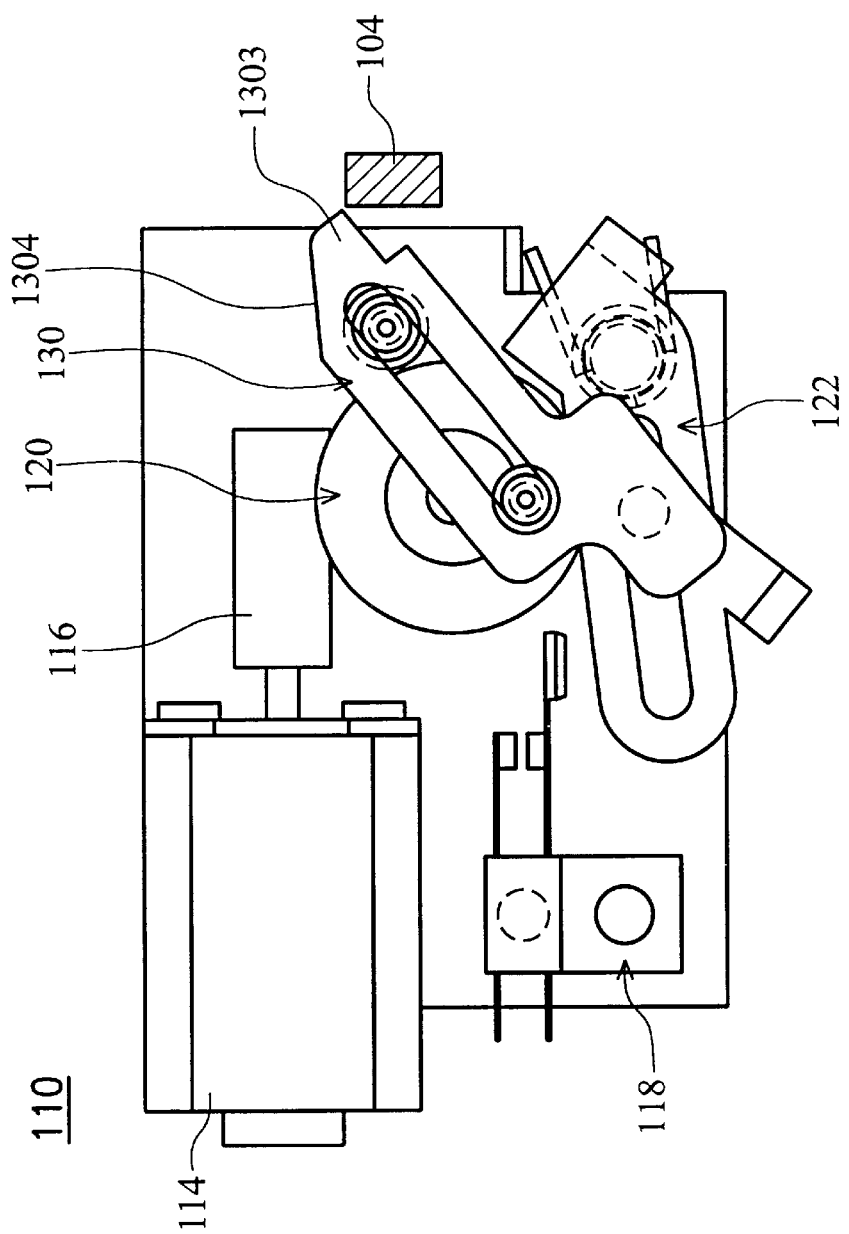
FIG. 10 is a top view of the ejection structure of the invention, wherein the main gear is located at a position of 180 degrees.

When the main gear 120 continues to rotate clockwise to a position of 180 degrees, as shown in FIG. 10, the engaging portion 1303 cannot engage with the protrusion 104. At this time, the tray T, in combination with the ejection structure 110, is to eject from the chassis 100.

Figure 11:
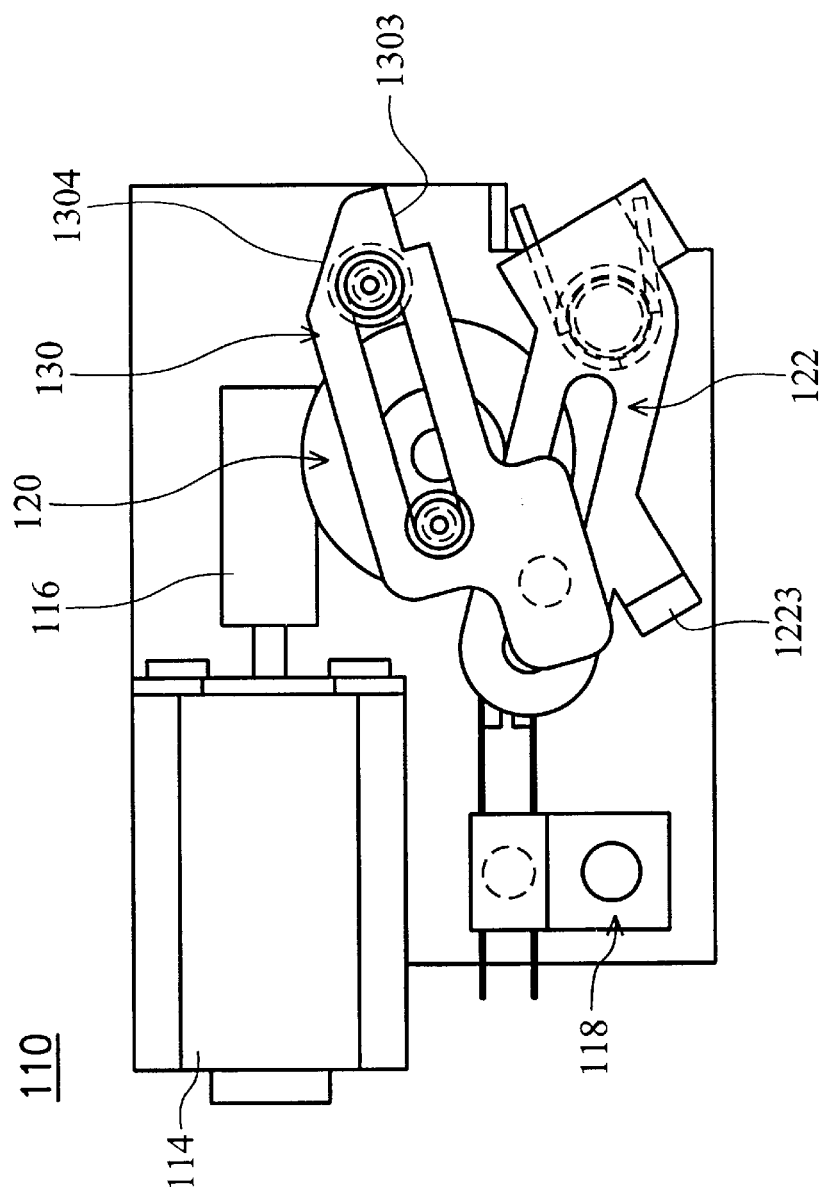
FIG. 11 is a top view of the ejection structure of the invention, wherein the main gear is located at a position of 270 degrees.

When the main gear 120 continues to rotate clockwise to a position of 270 degrees, as shown in FIG. 11, the second pushing arm 130 has completely disengaged from the protrusion 104. The tray T ejects from the chassis 100 by the resilient force of the spring 102 disposed on one side of the chassis 100. Specifically, because the motor 114 is still running, the main gear 120 continues to rotate clockwise.

When the main gear 120 continues to rotate clockwise to a position of 360 (0) degrees, the ejection structure 110 returns to the initial situation, as shown in FIG. 7. The first protruding portion 1223 of the first pushing arm 122 provides resilient force to the first connection portion 1181 of the limit switch 118. Thus, the first connection portion 1181 is connected to the second connection portion 1182 to move the limit switch 118 to the "ON" position. Then, the limit switch 118 outputs a signal to stop the motor 114.

When the tray T is to be inserted into the chassis 100, the angled portion 1304 of the second pushing arm 130 provides resilient force to the protrusion 104 to slide the protrusion 104 on the angled portion 1304. Since the first protruding pin 1201 and the third protruding pin 128 are stationary, the second pushing arm 130 can only be moved leftward to push the first pushing arm 122 and the twisting spring 126. After the tray T is pushed into the chassis 100, the twisting spring 126 provides resilient force to the first pushing arm 122 and the second pushing arm 130 to engage the engaging portion 1303 of the second pushing arm 130 with the protrusion 104. Thus, the tray T can be precisely positioned in the chassis 100.

Nevertheless, when the thin optical disk drive malfunctions and the tray T cannot eject from the chassis 100 normally, a thin object can be inserted into the ejection structure 110 from the outside of the tray T to push the second protruding portion 1224 of the first pushing arm 122. Then, the first pushing arm 122 rotates around the second protruding pin 124 to push the second pushing arm 130. Then, the engaging portion 1303 of the second pushing arm 130 disengages from the protrusion 104 and the tray T can be ejected from the chassis 100 by the resilient force of the spring 100 disposed on one side of the chassis 100.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ejection structure for an optical disk drive having a tray, the ejection structure disposed on the back surface of the tray to eject the tray, comprising:

a base;

a motor disposed on the base;

a worm gear connected to the motor;

a limit switch disposed on the base;

a main gear disposed on the base and engaged with the worm gear, the main gear having a first protruding pin;

a first pushing arm disposed on the main gear and having a first through groove and a through hole;

a second protruding pin disposed on the base and fitting in the through hole of the first pushing arm;

a twisting spring fitted on the second protruding pin and disposed between the first pushing arm and the base providing resilient force to the first pushing arm;

a third protruding pin disposed on the base;

a second pushing arm disposed on the first pushing arm and having a second through groove and an engaging pin, wherein the first protruding pin and the third protruding pin fit in the second through groove, and the engaging pin fits in the first through groove of the first pushing arm; whereby, when the motor drives the worm gear, the worm gear drives the main gear to rotate, so that the first pushing arm and the second pushing arm rotate and move relatively to eject the tray; and whereby, when the first pushing arm is pushed from the outside of the tray, the first pushing arm drives the second pushing arm to move linearly to eject the tray.

2. The ejection structure as claimed in claim 1, wherein the limit switch further comprises a first connection portion and a second connection portion.

3. The ejection structure as claimed in claim 2, wherein the first pushing arm further comprises a first protruding portion for oppressing the first connection portion of the limit switch.

4. The ejection structure as claimed in claim 1, wherein the first pushing arm further comprises a second protruding portion for emergently ejecting the tray.

5. The ejection structure as claimed in claim 1, wherein the base further comprises a fourth protruding pin fitted in the main gear.

6. An optical disk drive, comprising:

a chassis;

a tray disposed and sliding on the chassis;

a spring disposed on one side of the chassis and providing resilient force to the tray;

a protrusion disposed on the chassis; and an ejection structure disposed on the back surface of the tray and engaged with the protrusion, the ejection structure having a base, a motor, a worm gear, a limit switch, a main gear, a first pushing arm, a second protruding pin, a twisting spring, a third protruding pin and a second pushing arm, wherein the ejection structure is engaged with the protrusion by the second pushing arm; whereby, when the motor drives the worm gear, the worm gear drives the main gear to rotate, so that the first pushing arm and the second pushing arm rotate and move relatively until the second pushing arm disengages from the protrusion to eject the tray by resilient force of the spring; and whereby, when the first pushing arm is pushed from the outside of the tray, the first pushing arm drives the second pushing arm to move linearly until the second pushing arm disengages from the protrusion to eject the tray by resilient force of the spring.

7. The optical disk drive as claimed in claim 6, wherein the second pushing arm further comprises an engaging portion for engaging with the protrusion.

8. The optical disk drive as claimed in claim 6, wherein the motor is disposed on the base.

9. The optical disk drive as claimed in claim 8, wherein the worm gear is connected to the motor.

10. The optical disk drive as claimed in claim 9, wherein the limit switch is disposed on the base.

11. The optical disk drive as claimed in claim 10, wherein the main gear is disposed on the base and engaged with the worm gear and has a first protruding pin.

12. The optical disk drive as claimed in claim 11, wherein the first pushing arm is disposed on the main gear and has a first through groove and a through hole.

13. The optical disk drive as claimed in claim 12, wherein the second protruding pin is disposed on the base and fits in the through hole of the first pushing arm.

14. The optical disk drive as claimed in claim 13, wherein the twisting spring fits on the second protruding pin and is disposed between the first pushing arm and the base providing resilient force to the first pushing arm.

15. The optical disk drive as claimed in claim 14, wherein the third protruding pin is disposed on the base.

16. The optical disk drive as claimed in claim 15, wherein the second pushing arm is disposed on the first pushing arm and has a second through groove and an engaging pin, the first protruding pin and the third protruding pin fitting in the second through groove, the engaging pin fitting in the first through groove of the first pushing arm.

17. The optical disk drive as claimed in claim 6, wherein the limit switch further comprises a first connection portion and a second connection portion.

18. The optical disk drive as claimed in claim 17, wherein the first pushing arm further comprises a first protruding portion providing resilient force to the first connection portion of the limit switch.

19. The optical disk drive as claimed in claim 6, wherein the first pushing arm further comprises a second protruding portion for emergently ejecting the tray.

20. The optical disk drive as claimed in claim 6, wherein the base further comprises a fourth protruding pin fitting in the main gear.

* * * * *